United States Patent [19]
Kruse, Jr.

[11] 4,136,318
[45] Jan. 23, 1979

[54] SPIN-FLIP RAMAN LASER WITH INCREASED TUNING RANGE AND INCREASED EFFICIENCY

[75] Inventor: Paul W. Kruse, Jr., Edina, Minn.

[73] Assignee: Honeywell Inc., Minneapolis, Minn.

[21] Appl. No.: 794,889

[22] Filed: May 9, 1977

[51] Int. Cl.² ............................................. H01S 3/18
[52] U.S. Cl. .......................... 331/94.5 N; 331/94.5 H
[58] Field of Search .................. 331/94.5 C, 94.5 N, 331/94.5 H; 330/4.3; 307/88.3

[56] References Cited
U.S. PATENT DOCUMENTS
4,061,921 12/1977 Cantrell et al. ............... 331/94.5 N

OTHER PUBLICATIONS

Sattler et al., Tunable Spin-Flip Raman Scattering in Mercury Cadmium Telluride, Appl. Phys. Lett., vol. 25, No. 9 (Nov. 1, 1974), pp. 491-493.

Primary Examiner—William L. Sikes
Attorney, Agent, or Firm—Omund R. Dahle

[57] ABSTRACT

Disclosed are cascaded spin-flip Raman lasers involving alloy semiconductors such as mercury cadmium telluride with different energy gaps or with an energy gap gradient to provide for a relatively large change in frequency for a small change in field and enabling operation at low magnetic field levels where the output power and conversion efficiency are high.

17 Claims, 12 Drawing Figures

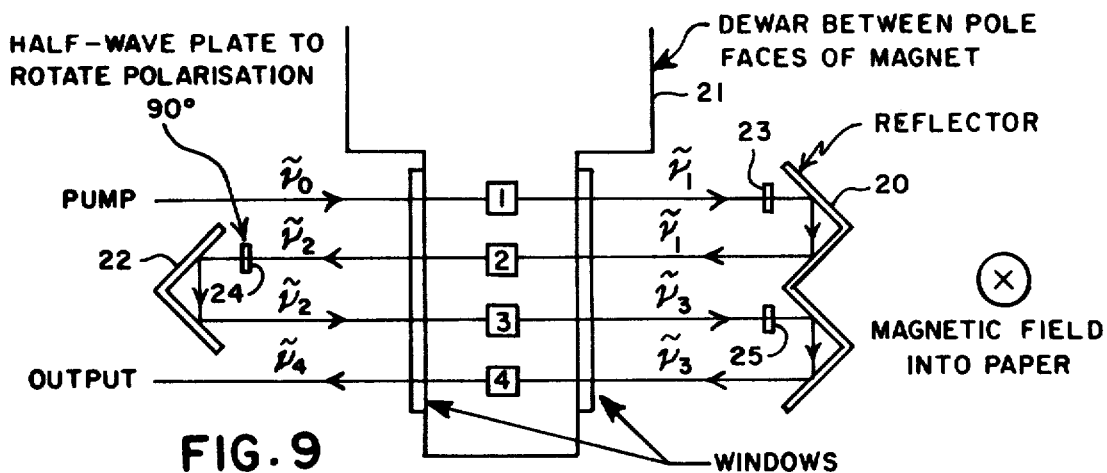
FIG. 9
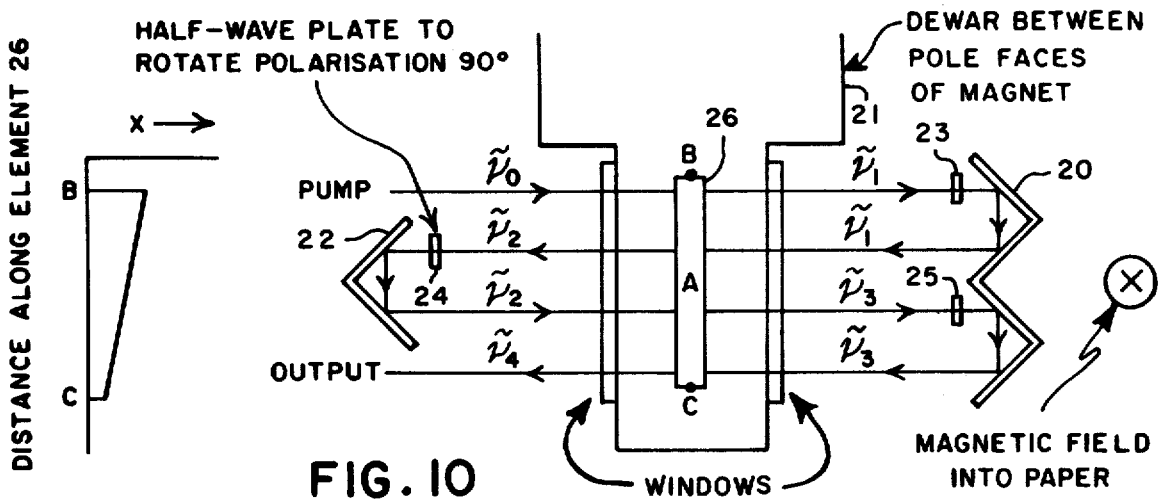
FIG. 10
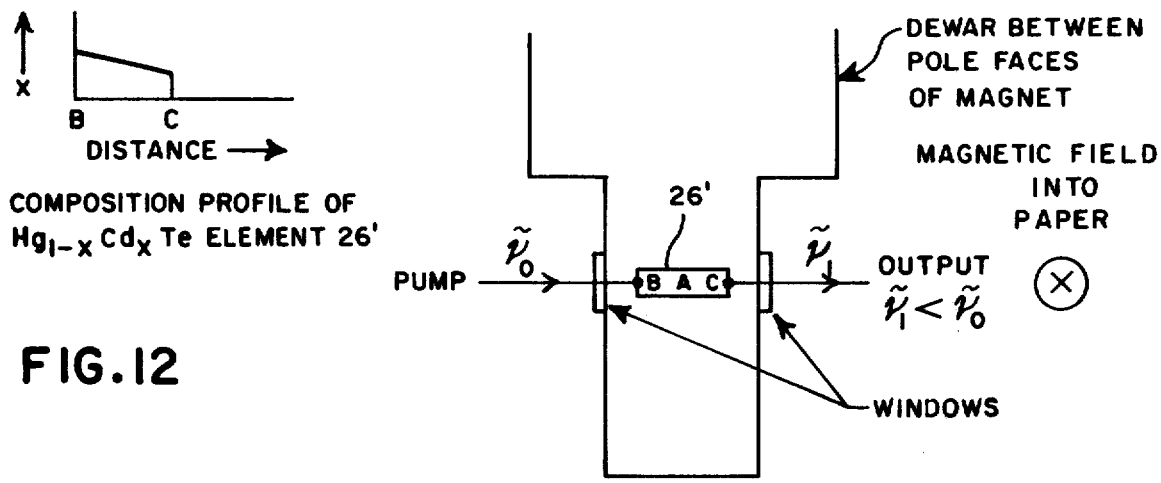
FIG. 12
FIG. 11

4,136,318

SPIN-FLIP RAMAN LASER WITH INCREASED TUNING RANGE AND INCREASED EFFICIENCY

BACKGROUND AND SUMMARY OF THE INVENTION

This invention relates to tunable spin-flip Raman lasers and more specifically to cascaded spin-flip Raman lasers of alloy semiconductors such as mercury cadmium telluride to provide for a relatively large change in frequency for a small change in magnetic field.

A conventional spin-flip Raman laser employs a piece of a semiconductor prepared in the form of a resonant cavity immersed in a magnetic field and cooled to a low temperature, say 15° K. or below. A laser pump focused on the semiconductor causes it to emit coherent radiation the frequency of which differs from that of the laser pump, depending on the magnetic field strength. The frequency can be lower (1st Stokes, 2nd Stokes, 3rd Stokes, etc.) or higher (1st anti-Stokes, 2nd anti-Stokes, etc.).

Spin-flip Raman lasers have a limited tuning range. As the magnetic field is increased, the output frequency increases linearly with field over a first range and then becomes less than linear. The output power from the Raman laser increases to a peak with increase in magnetic field to a given level then decreases as the wavelength increases. With increasing field a second peak may be reached; more than two peaks are possible also. In order to achieve a high conversion efficiency (i.e. output power divided by input power) it is necessary to have the energy gap of the semiconductor nearly equal to but slightly greater than the energy of the pump radiation, a condition known as resonance enhancement. For an arbitrary pump frequency this can be achieved through the use of an alloy semiconductor where the energy gap can be selected to meet the matching requirement. For example, mercury cadmium telluride $Hg_{1-x}Cd_xTe$ has been successfully employed with x approximately 0.23 to match the $CO_2$ pump laser wavelengths of 10.26 and 10.60 μm. A mercury cadmium telluride $Hg_{1-x}Cd_xTe$ spin-flip Raman laser as known in the art is generally described by FIG. 1 in which a $CO_2$ laser is used as a pump for the $Hg_{1-x}Cd_xTe$, where $x \approx 0.23$. The semiconductor in the form of a resonant cavity element is placed in a dewar and a cryogenic system is used to cool it to, say, 15° K. or below. An electromagnet has pole faces which straddle the dewar to apply a controllable magnetic field to the $Hg_{1-x}Cd_xTe$ crystal element. The output wavelength of the spin-flip Raman laser is tuned by changing the magnetic field so that, in effect, the combination becomes a tunable $CO_2$ laser. It is generally explained that the magnetic field splits the energy states for electrons in the conduction band into "spin up" and "spin down" states. The amount of splitting is proportional to the magnetic field and at very low temperatures substantially all of the electrons are in the lowest (spin up) state. When a photon from the $CO_2$ laser is scattered by an electron in the lowest (spin up) state the electron gains enough energy to enter the upper (spin down) state. This is known as a spin-flip transition. The photon loses the same amount of energy as is gained by the electron, and the photon emerges from the $Hg_{1-x}Cd_xTe$ element with a lower energy, i.e., a longer wavelength. The energy loss is approximately proportional to the magnetic field applied to the $Hg_{1-x}Cd_xTe$ element so the output wavelength of the spin-flip Raman laser is controlled by the magnetic field. In addition to the principal emission line, known as first Stokes, there sometimes are weaker lines known as second Stokes, third Stokes, etc., and other weak lines known as first anti-Stokes, second anti-Stokes, etc. This is generally shown graphically in FIG. 2. The second Stokes, third Stokes, etc. lines shift toward longer wavelengths at rates twice, three times, etc. as the first Stokes. The first anti-Stokes, second anti-Stokes, etc. lines shift toward shorter wavelengths in the same manner. A more complete description of this background information is discussed in a publication "Observation of First Stokes, Second Stokes, and Anti-Stokes Radiation From a Mercury Cadmium Telluride Spin-flip Raman Laser", Paul W. Kruse, Applied Physics Letters Vol. 28, No. 2, pages 90–92, Jan. 15, 1976.

Problems with any conventional spin-flip Raman laser, including those using an alloy semiconductor of a uniform composition, include the following:

1. A large magnetic field is needed to achieve a large change in frequency, necessitating in many cases the use of superconducting magnets.

2. The output power, and therefore the conversion efficiency, exhibits two or more peaks with increasing magnetic field, see FIG. 3.

As the magnetic field is reduced from a value substantially greater than 10kG, the first peak appears at about 6–9kG. Further field reduction requires a second peak to appear at 2–3kG. It is probable that there are other peaks below 2kG, although these have not been experimentally verified. Therefore, at the high fields, well above 10kG, needed to obtain large changes in output frequency or wavelength, the conversion efficiency is extremely low, and decreases with increasing magnetic field. For a very large change in frequency the efficiency may be so low as to be relatively useless. The conversion efficiency is the ratio of output power from the spin-flip Raman laser to input power from the pump, say $CO_2$, laser.

3. The change in frequency with magnetic field, which is linear at low fields, becomes sublinear at higher fields.

This invention directed to a spin-flip Raman laser with increased tuning range and increased efficiency aims at avoiding the difficulties of the prior art mentioned above through the use of an optically cascaded spin-flip Raman laser. A specific embodiment employs $Hg_{1-x}Cd_xTe$. However, other alloy semiconductors, e.g., $Pb_xSn_{1-x}Te$, are also included.

BRIEF DESCRIPTION OF THE DRAWINGS

FIGS. 9, 10 and 11 show various embodiments of the invention.

FIG. 12 is a graphical representation of the composition profile of the alloy semiconductor shown in FIG. 11.

DESCRIPTION

The present invention is directed to a spin-flip Raman laser with increased tuning range and increased efficiency through the use of optically cascaded spin-flip Raman lasers. These cascaded lasers may involve either discrete pieces of semiconductor with different energy gaps or a single piece with an energy gap gradient. Let us consider a most direct embodiment using mercury cadmium telluride $Hg_{1-x}Cd_xTe$. This embodiment may have, for example, a spin-flip Raman laser employing $Hg_{0.77}Cd_{0.23}Te$ pumped by a $CO_2$ laser operating at $\lambda = 10.28$ $\mu$m (a wavenumber approximately of 973 cm$^{-1}$). Experiments with this embodiment show that, at a magnetic field of 8kG, the 1st Stokes output has a wavelength of approximately 10.60 $\mu$m ($\sim$943 cm$^{-1}$). In addition the conversion efficiency is at a peak at this relatively low field, and the frequency shift is still linear with field according to the relationship $$\Delta \bar{\nu} = g\beta \Delta H$$

where $\Delta \bar{\nu}$ is the change in wavenumber, $\beta$ is a constant, $\Delta H$ is the change in magnetic field and g is known as the level splitting factor which depends reciprocally upon x for $Hg_{1-x}Cd_xTe$. For x approximately 0.23 g is $\sim$ 80.

Figure 1:
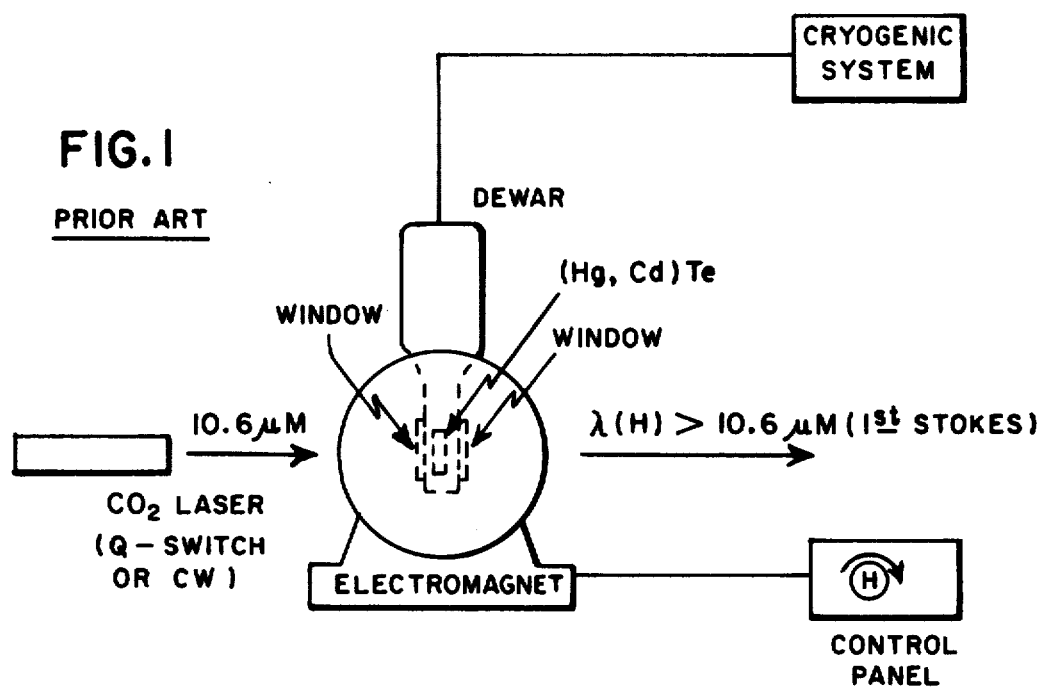
FIG. 1 is a block diagram layout of a prior art spin-flip Raman laser apparatus.
Figure 2:
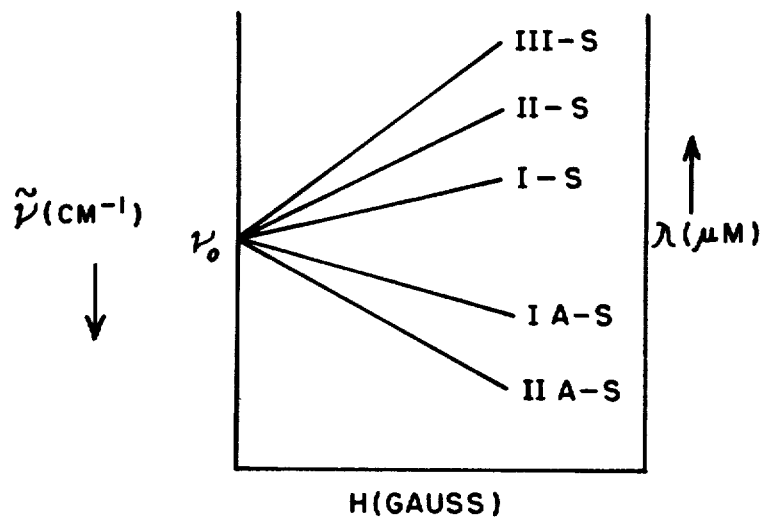
FIG. 2 is a graphical showing of various emission lines of a spin-flip Raman laser.
Figure 3:
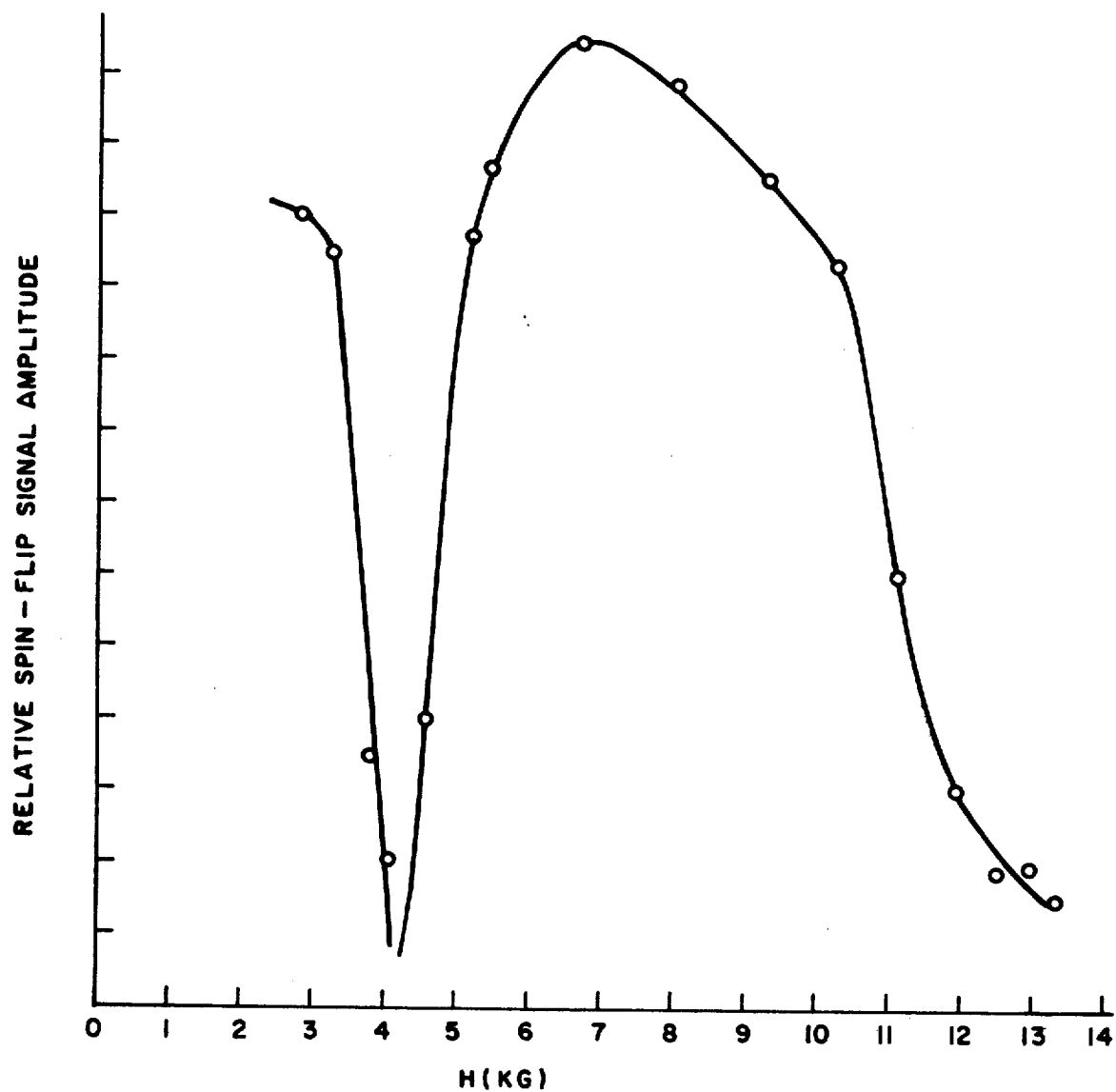
FIG. 3 is a graph showing measured output power (i.e., relative spin-flip signal amplitude) vs. magnetic field.
Figure 4:
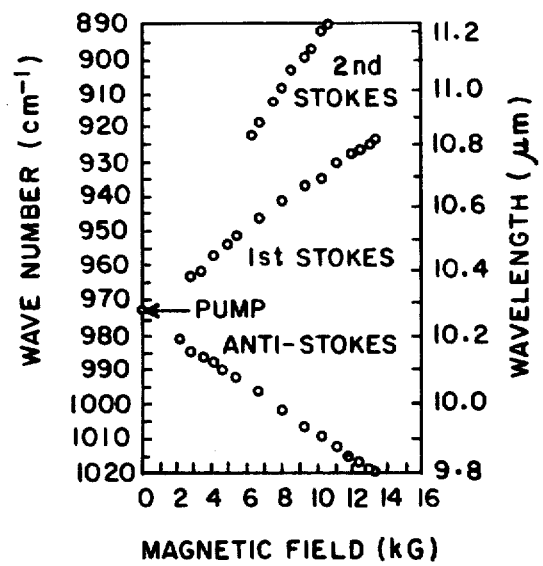
FIG. 4 is a graph of wavelength (μm) and wave number ($cm^{-1}$) vs. magnetic field (kG) of the radiation from $Hg_{0.77}Cd_{0.23}Te$ pumped at 10.28 μm.

If this embodiment is pumped by a $CO_2$ laser operating at $\lambda = 10.28$ $\mu$m, the results are shown in FIG. 4. In this experiment, first Stokes, second Stokes and anti-Stokes signals were detected in addition to the transmitted 10.28 $\mu$m radiation, and each is plotted as a function of magnetic field (kG) in FIG. 4.

Figure 5:
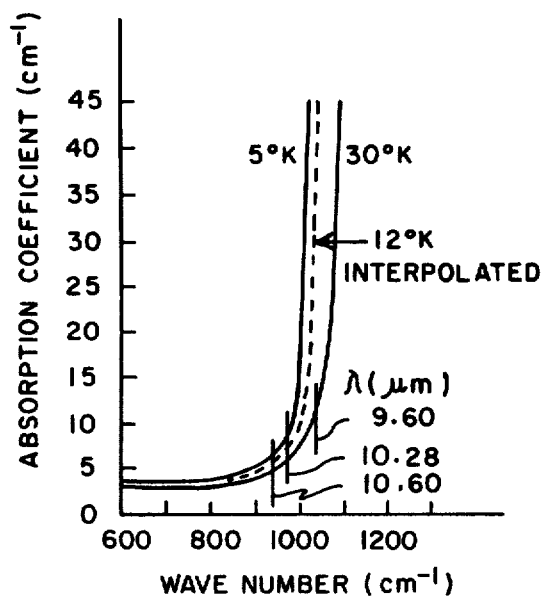
FIG. 5 is a graph of the optical absorption coefficient of $Hg_{0.77}Cd_{0.23}Te$ as a function of wave number and temperature.

FIG. 5 is a graphical showing of the optical absorption coefficient of $Hg_{0.77}Cd_{0.23}Te$ as a function of wavenumber and temperature. It may be appreciated that at the 10.28 $\mu$m wavelength and at a temperature of 12° K. the absorption coefficient is also in an acceptable range.

Figure 6:
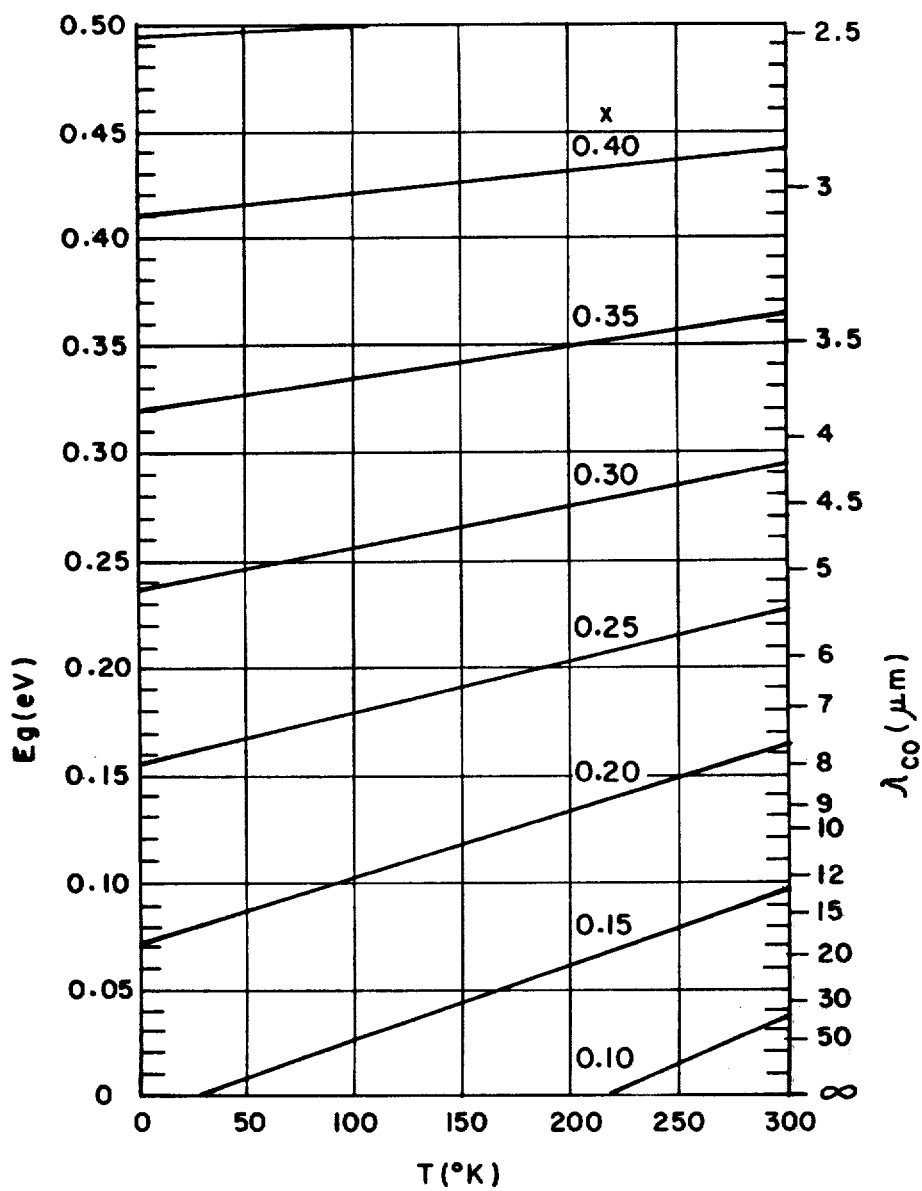
FIG. 6 is a graphical showing of the temperature dependence of the energy gap as a function of composition variable x in $Hg_{1-x}Cd_xTe$.
Figure 7:
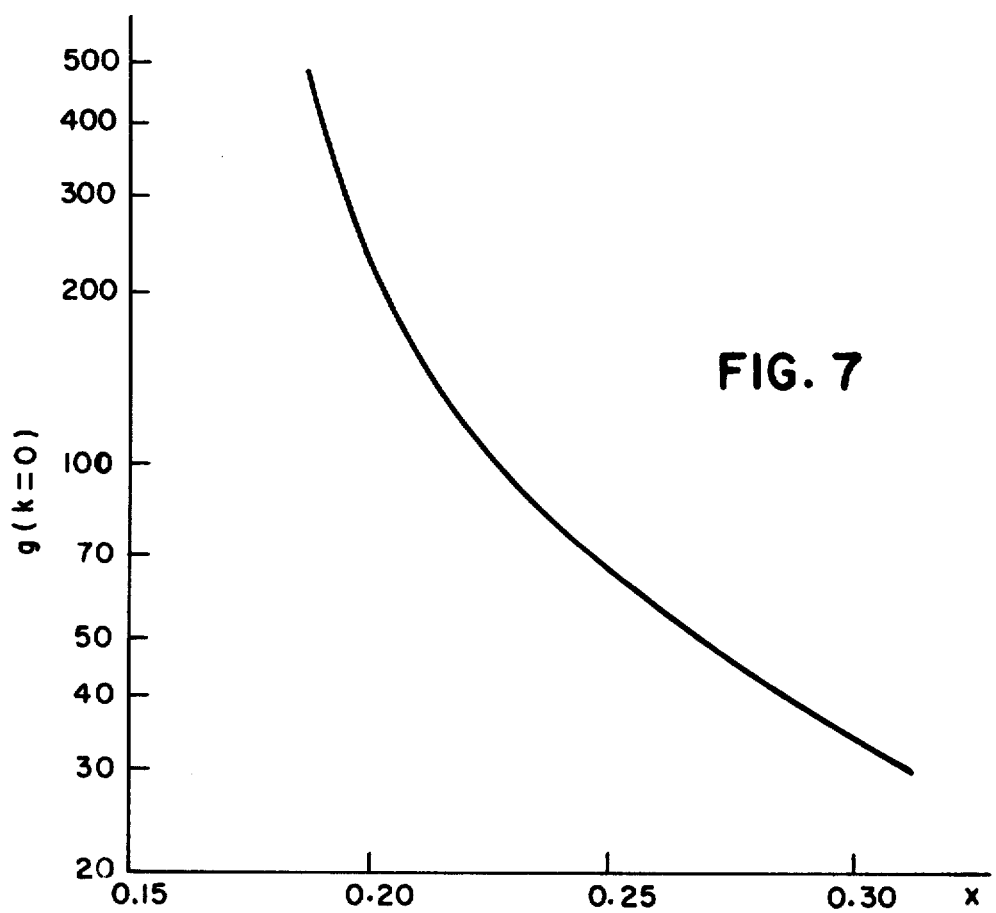
FIG. 7 is a graphical showing of the dependence of the g value at the conduction band edge upon composition variable x in $Hg_{1-x}Cd_xTe$.
Figure 8:
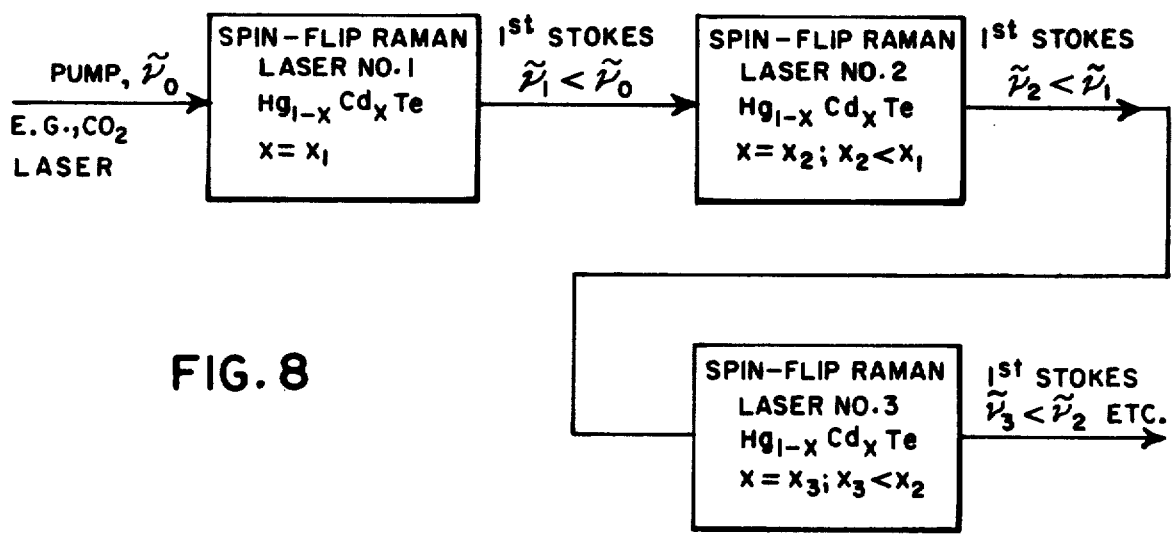
FIG. 8 in block diagram form shows an embodiment of the cascaded Raman lasers of this invention.

FIG. 8 is a general block diagram of the invention and it can be seen that a $Hg_{1-x}Cd_xTe$ spin-flip Raman laser No. 1, having a value of $x = x_1$ is being pumped by a $CO_2$ laser. The first Stokes output signal $\nu$, of laser No. 1 is the input to a spin-flip Raman laser No. 2 having an x value of $x = x_2$ where $x_2 < x_1$. The energy gap of the laser No. 2 semiconductor is tailored to meet the resonance enhancement condition for the output frequency of the first spin-flip Raman laser. In the example cited, this requires that x be reduced so that $x_2 \approx 0.22$. This can be seen from FIG. 6 in which is shown the temperature dependence of the energy gap as a function of composition as determined from the empirical expression $Eg = 1.59x - 0.25 + 5.233(10^{-4})T(1-2.08x) + 0.327x^3$. (After J. L. Schmit and E. L. Stelzer, J. Appl. Phys. 40, 4865 (1969)). As FIG. 7 shows, as x is decreased, g is increased, in this example to $g \approx 110$. For the same magnetic field the change in frequency between input and output of the second spin-flip Raman laser is greater than that of the first. Furthermore, an increase in g also means a higher gain per unit sample length and a lower input power lasing threshold. Thus there is an increased efficiency which compensates, at least in part, for the reduced input power to the second spin-flip Raman laser due to the conversion efficiency of the first spin-flip Raman laser. Referring again to FIG. 8, it may be seen that the first Stokes output signal $\bar{\nu}_2$ of laser No. 2 is the input to another spin-flip Raman laser No. 3, having an x value of $x = x_3$ where $x_3 < x_2$. The energy gap of the laser No. 3 semiconductor is tailored to meet the resonance enhancement condition for the output frequency of the second spin-flip Raman laser. In the example cited, this requires that $x_3 \approx 0.21$.

It can be seen that by cascading spin-flip Raman lasers as described above with two or more stages, as in FIG. 8, it is possible to achieve the desirable objectives of low field, high efficiency, large dynamic tuning range, and large change in frequency per unit change in field.

To simplify complexity it is possible to mount the several Raman lasers with differing energy gaps in the same dewar in the same magnetic field. Thus, as shown in FIG. 9, the radiation is brought in through a window in the dewar to the spin-flip Raman laser 1 which has the widest energy gap, the output $\bar{\nu}_1$ of that laser is transmitted out of the dewar through another window, is directed back by reflector means 20 to become the input of the second laser. The spin-flip Raman lasers are thus optically in series or in cascade. All of the optically cascaded spin-flip Raman lasers 1, 2, 3 and 4 shown in FIG. 9 are within a common dewar 21, which dewar is between the pole faces of a controllable electromagnet. The output $\bar{\nu}_2$ of laser 2 is directed back by reflector means 22 to become the input of the third, and so on as shown. This will be called the transverse geometry, since the radiation is transverse to the direction of the change in energy gap. This embodiment is advantageous because it allows the plane of polarization of the radiation to be rotated through 90° external to the dewar. To accomplish this, at the output of each spin-flip Raman laser is a 90° plane of polarization rotating means such as a half-wave plate 23, 24 and 25. The conversion efficiency is highest when the polarization (E-vector) of the input radiation is parallel to the magnetic field vector. Because the polarizaton of the output is rotated 90° with respect to the input it is desirable to rotate it again 90° before allowing it to impinge upon the second sample. A monotonic composition change exists in the four lasers shown progressing from laser #1 through #2, #3 and #4.

It is clear that the same cascading effect can be achieved if the series of Raman lasers in the dewar is replaced by a single sample of an alloy semiconductor e.g., $Hg_{1-x}Cd_xTe$, having a composition gradient, such that each successive pass of the radiation through the semiconductor encounters a different region with a different energy gap as shown in FIG. 10. The advantages of a single sample rather than several are realized by the embodiment. The system in complexity is then similar to a conventional spin-flip Raman laser, i.e., one magnet, one laser, one dewar, but with the advantages described above. Thus, in FIG. 10 the embodiment is much the same as described for FIG. 9 except that a single elongated alloy semiconductor element 26 replaces the elements 1, 2, 3 and 4 of FIG. 9. The alloy semiconductor element 26, which as has been mentioned may be $Hg_{1-x}Cd_xTe$ having a composition gradient along its length, that is, x varies along the length such as is shown in the graphical representation at the left edge of FIG. 10.

Another embodiment of the invention is shown in FIG. 11 in which the alloy semiconductor element 26' is mounted orthogonal to that earlier shown to direct the radiation in the direction of the composition gradient rather than transverse to it, as was explained in FIG. 10. In this embodiment it is not necessary to cause the radiation to repeatedly exit and re-enter the sample. Rather, as the radiation traverses the element 26' in the direction of the gradient, entering the widegap portion where it achieves resonance enhancement, it is continuously shifted in wavelength as it moves through the sample, changing in output frequency to that characterized by the smaller energy gap at the output end. Once again, a single magnet and single dewar only are required. FIG. 12 plots the composition profile of the $Hg_{1-x}Cd_xTe$ element 26'.

The embodiments of the invention in which an exclusive property or right is claimed are defined as follows:

1. Improvements in spin-flip Raman laser apparatus having increased tuning range and efficiency comprising:
   alloy semiconductor crystal resonant cavity means having at least two optically cascaded portions, said portions exhibiting a selected compositional change from one portion to the next, said composition change being accompanied by a change in energy gap.

2. The invention according to claim 1 wherein the chemical composition of said alloy semiconductor is selected from a group consisting of $Hg_{1-x}Cd_xTe$ and $Pb_xSn_{1-x}Te$ and wherein the composition of each is varied by changing the value of x, and wherein the energy gap change is accomplished by a change in the value of x.

3. The invention according to claim 2 wherein the alloy semiconductor is $Hg_{1-x}Cd_xTe$ and wherein the value of X lies in the range of from 0.17 to 1.0.

4. The invention according to claim 1 wherein said at least two optically cascaded portions are separate crystals of $Hg_{1-x}Cd_xTe$.

5. The invention according to claim 1 wherein said at least two optically cascaded portions are in a single body of semiconductor material.

6. The invention according to claim 5 in which said single body of semiconductor is $Hg_{1-x}Cd_xTe$.

7. The invention according to claim 5 wherein said single body of semiconductor material has a selected composition gradient along said body, said invention further comprising:
   laser pump means directing a beam of wavelength $\nu_0$ into a first of said portions of said alloy semiconductor resonant cavity means, said first portion providing an output of wavelength $\nu_1$ and,
   further means comprising reflector means redirecting said output $\nu_1$ back into said single body at a second of said portions, said second portion providing an output of wavelength $\nu_2$.

8. The invention according to claim 7 wherein said further means also includes means to rotate polarization of output $\nu_1$ by 90°.

9. The invention according to claim 5 wherein said single body of alloy semiconductor material is elongated and has a selected composition gradient along said body, said elongated single body being oriented so that radiation enters the end of said single body thereby stimulating the Raman laser of said first portion and from which stimulated radiation thereby progresses longitudinally through said body from one portion to another, each successive Raman laser portion stimulating a new frequency.

10. The invention according to claim 9 wherein the radiation is caused to enter at the end having the widest energy gap.

11. In a tunable spin-flip Raman laser of the type in which alloy semiconductor crystal resonant cavity means is positioned in a dewar and acted upon by a magnetic control field, the improvement comprising:
    alloy semiconductor crystal resonant cavity means having at least two portions, said portions being optically cascaded, and each of said cascaded portions having an energy gap which differs from that of the previous portion.

12. The invention according to claim 11 wherein said alloy semiconductor crystal resonant cavity means is of a mercury cadmium telluride chemical composition, wherein said composition is expressed as $Hg_{1-x}Cd_xTe$ and wherein the energy gap difference is accomplished by a change in the value of x and wherein the value of X lies in the range of from 0.17 to 1.0.

13. The invention according to claim 11 wherein said at least two portions comprise at least first and second Raman lasers with differing energy gaps in the same dewar and in the same magnetic field, the invention further comprising:
    a first window means in said dewar to admit radiation $\bar{\nu}_0$ to said first Raman laser;
    a second window means in said dewar through which the output radiation of wavelength $\bar{\nu}_1$ of said first Raman laser is transmitted; and,
    means redirecting the output radiation $\bar{\nu}_1$ back into the dewar and to the second Raman laser which provides a second output of wavelength $\bar{\nu}_2$.

14. The invention according to claim 9 wherein said at least two optically cascaded portions are separate crystals of $Hg_{1-x}Cd_xTe$.

15. The invention according to claim 13 wherein said at least two optically cascaded portions are in a single body of semiconductor material.

16. The invention according to claim 11 wherein said at least two optically cascaded portions are in a single body of semiconductor material oriented longitudinally so that radiation enters the alloy semiconductor crystal resonant cavity means from one end to stimulate the Raman laser of the first portion which stimulated radiation progresses longitudinally through the alloy semiconductor crystal from one portion to another, each successive Raman laser portion stimulating a new frequency.

17. The invention according to claim 16 wherein the radiation is caused to enter at the end having the widest energy gap.

* * * * *